United States Patent [19]
Mika et al.

[11] 3,828,196
[45] Aug. 6, 1974

[54] X-RAY PHOTOGRAPHING DEVICE

[75] Inventors: Norbert Mika; Rudolf Schuldreich; Helmut Berger, all of Erlangen, Germany

[73] Assignee: Siemens Aktiengesellschaft, Erlangen, Germany

[22] Filed: Mar. 8, 1973

[21] Appl. No.: 328,145

[52] U.S. Cl.............................. 250/468, 250/471
[51] Int. Cl. ............................................ G03b 41/16
[58] Field of Search........................... 250/468, 471

[56] References Cited
UNITED STATES PATENTS

| | | | |
|---|---|---|---|
| 3,150,263 | 9/1964 | Catlin | 250/468 |
| 3,415,988 | 12/1968 | Gidlund | 250/468 |
| 3,535,518 | 10/1970 | Fischer | 250/468 |

Primary Examiner—James W. Lawrence
Assistant Examiner—C. E. Church
Attorney, Agent, or Firm—Richards & Geier

[57] ABSTRACT

An X-ray photographing device has a transporting device for sheet films for transporting individual loose film sheets from a ready position protected from rays to a photographing position and from the photographing position to a delivery location protected from rays. The invention is particularly characterized by the provision of a film carriage having at least one suction cup for holding the film sheets and connected to a pressure actuating system.

7 Claims, 2 Drawing Figures

PATENTED AUG 6 1974   3,828,196

X-RAY PHOTOGRAPHING DEVICE

This invention relates to an X-ray photographing device provided with a transporting device for sheet films for transporting individual loose film sheets from a ready position protected from rays to a photographing position and from the photographing position to a delivery location protected from rays.

An X-ray photographing device is known wherein individual film sheets are cut off from a film roll and are moved by transporting rollers engaging the lower film edge from a ready position protected from rays to a photographing position and from the photographing position to a collecting container protected from rays. It was found that this X-ray photographing device has the drawback that the transportation of film sheets is not safe and causes disturbances. Another drawback of this device is that the size of the films is limited to that extending to the transporting rollers located below the lower limit of the greatest photographing area. This unnecessarily increases film consumption.

In another known X-ray photographing device rolled films of different widths are moved by transporting rollers to the photographing area and back again. The photographed rolled film sections are then cut up and reach through other transporting rollers a collecting container. Users of this device object to the damage of the emulsion layer of the film by the transporting rollers and by sliding friction when the roll film strip which is always slightly curved is shifted into the photographing area.

An object of the present invention is to provide means in an X-ray photographing device for transporting film sheets in a simple, safe and greatly protected manner, without having to take into consideration any limitations concerning the selection of size and the location of the photographing area in the photographing apparatus.

Other objects of the present invention will become apparent in the course of the following specification.

In the accomplishment of the objectives of the present invention it was found desirable to provide a film carriage which uses for holding the film sheets at least one suction cup connected to a pressure actuating system.

This type of file sheet transportation of the present invention has the great advantage that the film sheets are only once sucked to the film carriage and then can be transported as desired in the X-ray photographing device without subjecting their outer surfaces to a sliding or rolling friction.

According to a particularly advantageous embodiment of the present invention the suction cups can be placed in that range of the film sheets which is provided for name scanning. In this way the suction cups do not interfere with the placing of strengthening foils on both sides of the film sheets required in the photographing position and they are located in a section of film sheets wherein impressions of the holding edges of the suction cups upon the emulsion layer of the film sheets can be tolerated.

A safe transportation of the film sheets is attained when the suction cups are located at the edge of the film sheets which is the front edge in the direction of transportation. Due to this arrangement the film sheets lie closely on the film carriage in the direction of transportation and do not remain hanging on any edges.

A particularly useful construction of the X-ray photographing device of the present invention is produced when the film carriage is stopped by a supporting plate in the photographing position at its side directed to the sucked in film sheet, whereby the plate and the carriage can be pressed against each other by the use of an intermediate frame shaped tight pad. The wall sections of the carriage and of the plate against which the film sheet lies are provided with separate strengthening foils, while the wall section directed toward the ray source is elastically bendable. The low pressure engagement of the strengthening foils with the film sheets can be thus produced with comparatively small energy by the use of a low pressure device. It provides a safe pressure of the film sheets against the strengthening foils without air bubbles.

The invention will appear more clearly from the following detailed description when taken in connection with the accompanying drawing showing by way of example only, a preferred embodiment of the inventive idea.

Figure 1:
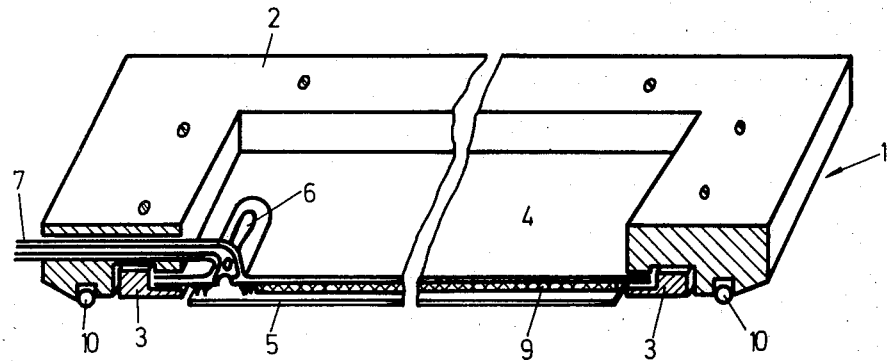
FIG. 1 is a perspective view of a film carriage, partly in section.
Figure 2:
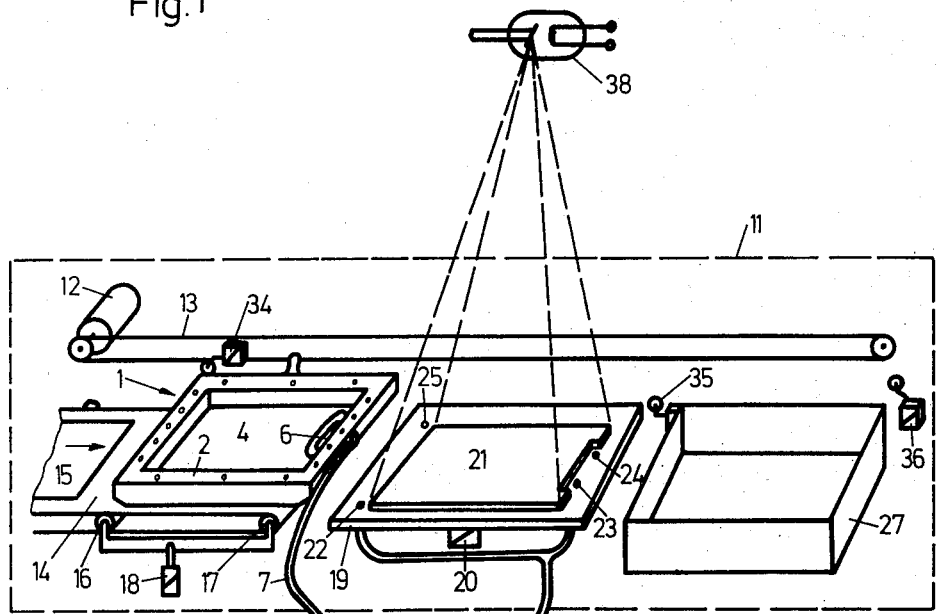
FIG. 2 is a diagrammatic view illustrating the transportation of the film sheets in the X-ray photographing device.
Figure 2:
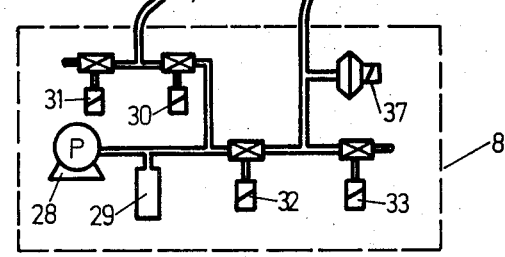

FIG. 1 shows a film carriage 1 consisting of a rectangular frame 2 and an elastic diaphragm 4 for the film sheet 5, the diaphragm being fixed in the frame 2 by means of a tensioning frame 3. A suction cup 6 is provided at the diaphragm opposite that part of the film sheet which will be used later for name inscription. The suction cup 6 is connected by a hose 7 to a pressure actuating system 8 (FIG. 2). A strengthening foil 9 is glued upon the side of the diaphragm 4 directed to the film sheet 5, with the exception of that section in which the suction cup 6 is located. The frame of the carriage is provided all around with a dense pad 10 upon the side directed toward the film sheets being received.

FIG. 2 which illustrates the transportation of film sheets in an X-ray photographing device 11, also shows the film carriage 1 which can be moved by a motor drive 12 through a cord line 13 from a ready position to a photographing position and from the photographing position to a delivery position. In the ready position the carriage 1 is located directly over a transporting band 14 for the delivery of unilluminated film sheets 15. The running rollers 16 and 17 of the transporting band 14 can be shifted by a movable magnet 18 in the direction toward the film carriage. In the photographing position the film carriage is located directly opposite a supporting plate 19. The plate 19 can be shifted vertically by another movable magnet 20 in the direction toward the film carriage located in the photographing position. The supporting plate is connected tumbler-like to this magnet to provide continuously good adherence to the film carriage. A second strengthening foil 21 of the same size as the foil 9 is located upon the plate 19 precisely opposite the foil 9 when the film carriage 1 is in the photographing position. To the side of the foil 21 the plate 19 has bore holes 22, 23, 24 and 25 which are connected by a hose 26 to the pressure actuating system 8. The delivery location of the film carriage is located directly above a receiving container 27, so that film sheets released by the film carriage reach the container directly.

The pressure actuating system 8 consists of a low pressure producer 28, a pressure receiving container 29 and magnetic valves 30, 31, 32 and 33 by means of which the individual lines 7 and 26 can be selectively evacuated and again supplied with air. End switches 34, 35 and 36 are located in the path of the film carriage in the ready position, the photographing position and the delivery position, respectively, by means of which the drive 12 of the film carriage can be stopped in the different working positions and the pressure actuating system 8 can be switched over.

After the film carriage 1 has moved into the ready position the switch 34 stops the drive 12 of the carriage, the magnet 18 for the rolls 16, 17 of the transporting band 14 is switched on for a short time and the valve 30 of the pressure actuating system 8 is opened. As such as the unphotographed film sheet lying upon the transporting band 14 engages the edges of the suction cup 6, underpressure is produced in the suction cup by which the film sheet is firmly held upon the film carriage 1.

When in the course of an examination the doctor starts photographing the motor drive 12 of the film carriage 1 is switched on and the carriage is moved into the photographing position. When the photographing position is reached the switch 35 which is located there, switches off the motor drive of the film carriage and at the same time actuates the magnet 20 for the plate 19. The plate 19 is pressed by the magnet against the pad 10 of the film carriage so that an air tight hollow space is produced between the film carriage and the plate. At the same time the magnetic valve 32 of the pressure actuating system 8 is opened and the hollow space between the film carriage and the plate is evacuated. By atmospheric pressure the diaphragm 4 of the film carriage 1 with the strengthening foil 9 is pressed against the sucked film sheet 5 at the strengthening foil 21 of the plate 19. Due to the curving of the diaphragm 4 the pressure proceeds from the middle of the strengthening foils to their edges, so that no air bubbles remain between the strengthening foils and the film sheet. As soon as sufficient under pressure has been established the pressure switch 37 connected to the line 26 supplies voltage to the X-ray tube 38 and the photographing takes place.

Directly after the photographing the magnetic valve leading to the under pressure producer is closed and the space between the plate and the film carriage is aired by opening the magnetic valve 33. At the same time the magnet 20 for the plate 19 is switched off and the drive 12 for the film carriage is switched on again. The film carriage then moves into the discharging position and when it is reached the motor drive of the carriage is again stopped by the end switch 36 and instead of the magnetic valve 30 the magnetic valve 31 will open. This aerates the suction cup 6. The film sheet 5 is now loosened from the film carriage and drops into the reception container 27. After a short time interval the motor drive 12 for the film carriage is switched on in the opposite direction, the film carriage moves back into the charging position and the described procedure can be repeated. The transporting band 14 which provides a new film sheet into the ready position is switched on in synchronism with the movement of the film carriage from the ready position into the photographing position.

The described transportation device for film sheets avoids any rolling or sliding friction upon the film sheet. Furthermore, film sheets of different sizes can be transported in the described manner and any desired sections of the illumination field of the photographing device can be photographed by a corresponding stopping of the film carriage in the photographing position. The transporting band can be replaced by a film supplying container and the film receiving container can be replaced by a transporting system which will transmit the illuminated films directly into the following developing automat.

What is claimed is:

1. In an X-ray photographing device having an X-ray tube, means for transportation of film sheets having a ready station for taking up unexposed film sheets, a delivery station for the delivery of the exposed film sheets and having a storing cassette receiving the exposed film sheets, and an exposure station between said ready station and said delivery station and including a fixed plate having a first intensifying screen, said means comprising a movable carriage having a second intensifying screen, said carriage having a suction cup, and a low-pressure actuating system connected with said suction cup and holding a film sheet in front of said second intensifying screen and moving said film sheet, together with the carriage, through these stations.

2. A device in accordance with claim 1, wherein said suction cup is adapted to engage that portion of said film sheet which is used for name inscription.

3. A device in accordance with claim 1, wherein said suction cup is adapted to engage the margin of said film sheet which is in the front in the direction of transportation.

4. A device in accordance with claim 1, comprising means operating said pressure-actuating system in relation to the location of said carriage.

5. A device in accordance with claim 1, having means pressing said plate against said carriage for stopping with said film sheet in front of said plate in said exposure station between said X-ray source and said plate, said carriage having a frame-like structure with an elastically bendable wall on its side opposite to said plate holding said suction cup, said carriage and said plate having each one intensifying screen located on their surfaces opposite to one another, said carriage having a frame-like pad, fixed on the side opposite to said plate.

6. A device in accordance with claim 5, comprising tumbler-like means supporting said plate for engagement with said carriage, said plate being movable in the direction of X-rays.

7. A device in accordance with claim 5, comprising a low-pressure actuated switch switching on said X-ray tube when adequate low pressure has been provided between said carriage and said plate.

* * * * *